United States Patent [19]

Miklos

[11] 4,170,683

[45] Oct. 9, 1979

[54] REFLECTIVE SENSE MARKER FOR MAGNETIC RECORDING TAPE

[75] Inventor: Richard L. Miklos, Afton, Minn.

[73] Assignee: Minnesota Mining and Manufacturing Company, St. Paul, Minn.

[21] Appl. No.: 878,079

[22] Filed: Feb. 15, 1978

[51] Int. Cl.² .............................................. H01F 10/00
[52] U.S. Cl. .................................. 428/336; 428/339; 428/461; 428/464; 428/900
[58] Field of Search ............................... 427/128–132, 427/48; 428/900, 336, 339, 461, 464

[56] References Cited

U.S. PATENT DOCUMENTS 2,684,918   7/1954   Oughton ............................. 428/344

Primary Examiner—Bernard D. Pianalto
Attorney, Agent, or Firm—Cruzan Alexander; Donald M. Sell; Robert E. Granrud

[57] ABSTRACT

Improved reflective sense marker less than 2.5 micrometers in thickness including (a) a reflective thin-film metal coating, (b) a thin layer of adhesive bonding the thin-film coating to the back side of a magnetic recording tape, and (c) a thin, tough, abrasion-resistant transparent polymeric protective layer such as a copolymer of ethylene and vinyl acetate covering the thin-film coating.

7 Claims, 1 Drawing Figure

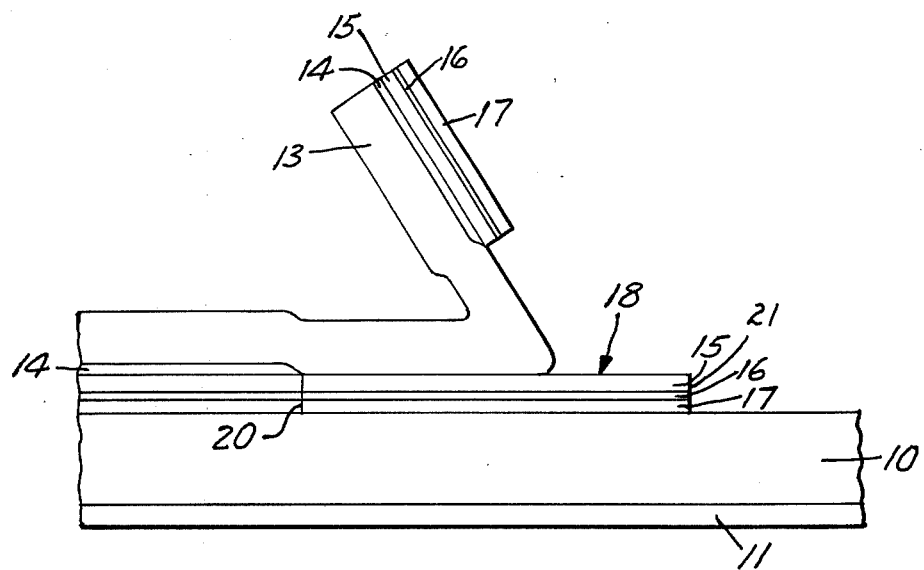

REFLECTIVE SENSE MARKER FOR MAGNETIC RECORDING TAPE

BACKGROUND OF THE INVENTION

Magnetic recording tape for computer or instrumentation use is generally provided with reflective sense markers at the beginning and end of the tape. A typical sense marker consists of oriented polyester film which has been vapor coated with aluminum and then overcoated on the vapor-coated side with a pressure-sensitive adhesive. As applied, the polyester film protects the fragile vapor coat from the abrasion attendant to operation of the tape drive. Among problems associated with such sense markers is oozing of the adhesive under the cumulative pressure in winding a great length of the tape upon itself. Also, the thickness of the sense marker may be projected through a number of convolutions of the wound tape to produce what are called "sense marker impressions". These impressions or distortions in the tape tend to cause signal dropouts.

THE PRESENT INVENTION

The present invention involves a reflective sense marker which is free from problems of sense markers of the prior art, not being subject to adhesive oozing and being so thin that it produces no "sense marker impressions". Although inherently less resistant to abrasion than are the prior sense markers, the novel sense marker has withstood hundreds of passes through typical tape drives without loss of its reflective sensing function. In many tape systems, the novel sense marker will be subjected to little or no wear, because the tape reverses direction as soon as the marker is sensed, before the marker is carried past more than one or two tape guides, if any. This is especially true of the end-of-tape sense marker. Since the beginning-of-tape sense marker is always at the outer convolutions of stored tape and thus is not subject to the pressures that produce adhesive oozing and sense marker impressions, some users may prefer to continue to use the prior sense markers at the beginning of the tape while adopting the present invention as the end-of-tape sense marker.

In brief, the novel sense marker comprises:

(a) a thin-film metal coating having at least 90% reflectivity at an incident angle of 45° (as measured in accordance with Section 3.3.2 of ANSI standard X3.40-1973) and a maximum thickness of 1000 Å, (b) a layer of heat-activated (e.g., hot-melt) adhesive which has a thickness of 0.2 to 1.5 micrometers, will not soften at 55° C. and bonds the thin-film metal coating to the back side of the tape, and (c) a tough, abrasion-resistant, transparent polymeric protective layer which covers the thin-film coating, has a thickness of 0.2 to 1.5 micrometers, and will not transfer to the overlying convolution of the tape when stored in roll form under adverse storage conditions (e.g., at 52° C. and 85% RH for 18 hours followed by 38° C. and 0-10% RH for 4 hours).

The novel sense marker may be produced by hot-stamping onto the back side of the tape certain types of roll leaf which are commercially available for such uses as lettering and decorating polyester packaging. A typical roll leaf consists of the following layers in order:

(a) a disposable carrier web having a low-adhesion surface, (b) a tough, abrasion-resistant transparent polymeric protective layer releasably adhered to the low-adhesion surface, which layer softens at 60°-115° C. and has a thickness of 0.2-1.5 micrometers, (c) a thin-film metal coating having a maximum thickness of 1000 Å and at least 90% reflectivity at an incident angle of 45°, and (d) a layer of heat-activatable adhesive 0.2-1.5 micrometers in thickness which is activatable at 115° C. or less but will not soften at 55° C.

A hot stamping press whose shoe equals the desired size of the sense marker presses the roll leaf against the back side of a magnetic recording tape to adhere the adhesive layer to the backing, whereupon the carrier web is peeled away, leaving the adhesive, thin-film metal coating and the protective layer on the tape in the pattern of the shoe.

In selecting the roll leaf, the thin-film metal coating should have at least 90% reflectivity at an incident angle of 45° to insure sensing on ordinary tape drives, a level normally attained by coatings of highly reflective metal of 250 to 1000 Å in thickness. At lesser thicknesses, the thin-film metal coating may be overly transparent. Thicknesses exceeding 1000 Å are considered wasteful. The thin-film metal coating may be any highly effective durable metal such as chromium, aluminum, gold, silver or alloys thereof.

The thickness of the adhesive layer should be at least 0.2 micrometer in order to provide adequate anchorage of the thin-film metal coating. At thicknesses greater than 1.5 micrometers, it might flow beyond the edge of the hot shoe with which the sense marker is laminated to the tape. Any such flow would tend to result in debris in using the tape.

The polymeric protective layer should have a thickness of at least 0.2 micrometer to provide adequate protection for the thin-film metal coating. Greater thicknesses would prolong the life of the sense marker, but the overall thickness of the sense marker should not exceed 2.5 micrometers to insure against "sense marker impressions" and resultant dropouts.

The polymeric protective layer can be provided by any polymer which softens at 115° C. but is nontacky at temperatures up to 60° C., has good toughness and abrasion resistance and is reasonably transparent in thin layers. Especially suitable are cellulose acetate and alkyd resins which soften at 100°-110° C. so that there is no danger of distorting the magnetic recording tape during application. The adhesive should be activated at a temperature within the range of 60°-115° C. and may, but need not, cure when activated.

The polymer of the protective layer and the adhesive preferably are compatible and have similar physical characteristics, e.g., softening points and expansion-contraction characteristics. The same material may be used for both of those layers, e.g., copolymer of ethylene and vinyl acetate.

THE DRAWING

The single FIGURE of the drawing schematically illustrates an edge view of a magnetic recording tape to which a reflective sense marker is being applied in the practice of the invention.

The drawing shows a fragment of magnetic recording tape consisting of a backing 10 and a magnetizable layer 11. Also shown is a fragment of roll leaf consisting of a disposable carrier web 13, a waxy release coating 14, a transparent polymeric protective layer 15, a thin-film metal coating 16 and a hot-melt adhesive layer 17.

A portion of the roll leaf has been hot-pressed against the back side of the magnetic recording tape to adhere a length of the adhesive layer 17 to the tape backing 10 to provide a sense marker 18 which is demarcated by reference characters 20 and 21 equaling the size of the heated stamping shoe (not shown). Because the release coating 14 may be fugitive under the heat applied by the stamping shoe, it is not shown in the area between reference characters 20 and 21, although some residue of the release coating is almost inevitably present both on the sense marker 18 and on the portion of the carrier web 13 which is being peeled away. By keeping the release coating 14 thin (e.g., about ¼ micrometer or less), any residue remaining on the sense marker is minor and should cause no problems. Because there is no adhesion between the adhesive layer 17 and the tape backing 10 outside of the area between the reference characters 20 and 21, the roll leaf will fall away as soon as it is peeled back beyond the edge of the sense marker 18 at the reference character 20.

EXAMPLE

The invention was embodied in a magnetic recording tape which was a conventional ½-inch (1.27-cm) computer tape having a biaxially-oriented poly(ethylene terephthalate) backing 10 and a magnetizable coating 11 of acicular gamma-$Fe_2O_3$ particles in an organic binder material which included a small percentage of conductive carbon black, and having a controlled-wind backside coating (not shown in the drawing) comprising conductive carbon black in an organic binder material. The overall thickness of the magnetic recording tape was about 45 micrometers.

The sense marker was produced from roll leaf marketed as Whiley-Kensol No. 1011 stamping foil, which is believed to comprise, in order: biaxially-oriented polyester carrier web 13 about 13 micrometers in thickness; a very thin release layer 14 which is probably paraffin wax; a polymeric protective layer 15 about 0.3 micrometer in thickness; aluminum vapor coat 16 about 350 Å in thickness; and an ethylene/vinyl acetate copolymer hot-melt adhesive 17 about 1.25 micrometers in thickness. The polymeric protective layer is believed to be a mixture of a chlorinated rubber such as Parlon P-10 and a polymer such as polyvinyl acetate.

Using the above-described roll leaf, a reflective sense marker was applied to the poly(ethylene terephthalate) backing of a magnetic recording tape with a Kensol K-16T hot stamping press at a shoe temperature of 113° C., 172 kg/cm² line pressure. This produced a rectangular sense marker 4.75 by 25 mm in area and less than 1.75 micrometers in thickness. Its reflectivity was above 90% at an incident angle of 45°, measured according to Section 3.3.2 of ANSI X3.40-1973 Specification. The sense marker was well adhered to the tape backing and was satisfactorily resistant to abrasion in that the marker was still functional after more than 6500 passes through a conventional tape drive, at which point the test was discontinued.

The tape was wound up at a tension of 240 grams to provide a 740-meter roll with the sense marker 7.5 meters from the tape end at the hub. The roll was stored at 52° C. and 85% relative humidity for 18 hours followed by 38° C. and 0-10% relative humidity for 4 hours. When 30 such rolls were tested on an IBM 3420, Model 8 tape transport (2460 characters per cm), no dropouts were found that were incurred due to the sense markers.

The sense markers and overlying tape convolutions of twenty of the rolls were examined visually without any evidence of corrosion or layer-to-layer transfer of any part of the sense markers.

Because sense markers of the prior art are less likely to produce dropouts when used on tape having a dispersion of conductive carbon black coated on its back side, the present invention is most useful for tapes having no backside coating.

What is claimed is:

1. Magnetic recording tape having firmly adhered to its back side a reflective sense marker which has a thickness not greater than 2.5 micrometers and acts as if it has zero thickness in that when the tape is wound upon itself in roll form, the sense marker produces essentially no permanent plastic deformation in overlying convolutions of the tape, said sense marker comprising
    (a) a thin-film metal coating having at least 90% reflectivity at an incident angle of 45° and a maximum thickness of 1000 Å,
    (b) a layer of heat-activated adhesive which has a thickness of 0.2-1.5 micrometers, will not soften at 55° C., and bonds the thin-film coating to the back side of the tape, and
    (c) a tough, abrasion-resistant, transparent polymeric protective layer which covers the thin-film coating, has a thickness of 0.2-1.5 micrometers and will not transfer to the overlying convolution of the tape when the tape is stored in roll form at 52° C. and 85% relative humidity for 18 hours followed by 38° C. and 0-10% relative humidity for 4 hours.

2. Magnetic recording tape as defined in claim 1 wherein the thin-film metal coating is aluminum.

3. Magnetic recording tape as defined in claim 1 wherein the thin-film metal coating is a chromium alloy.

4. Magnetic recording tape as defined in claim 1 wherein the thin-film metal coating is silver.

5. Magnetic recording tape as defined in claim 1 wherein the thin-film metal coating is gold.

6. Magnetic recording tape as defined in claim 1 wherein the heat-activated adhesive is a copolymer of vinyl acetate and ethylene.

7. Magnetic recording tape as defined in claim 1 wherein the polymeric protective layer comprises cellulose acetate.

* * * * *